July 7, 1959  H. W. SCHAFFER ET AL  2,894,239
BRUSH MECHANISM

Filed June 6, 1955  2 Sheets-Sheet 1

Inventors:
Herman W. Schaffer,
William Speicher,
by
Their Attorney.

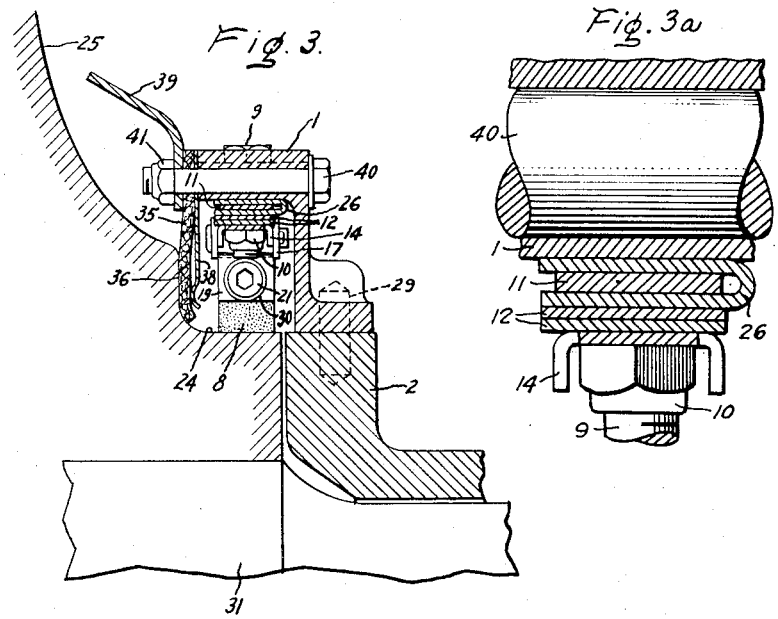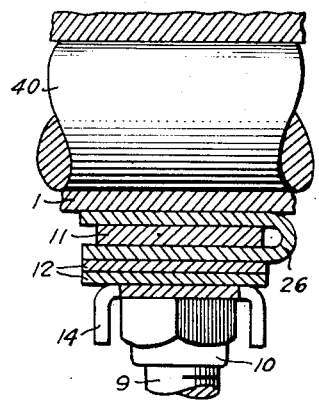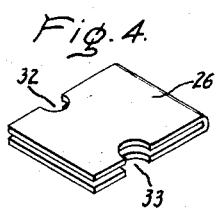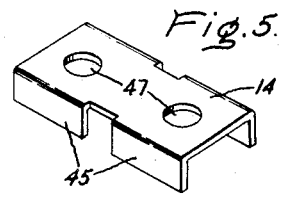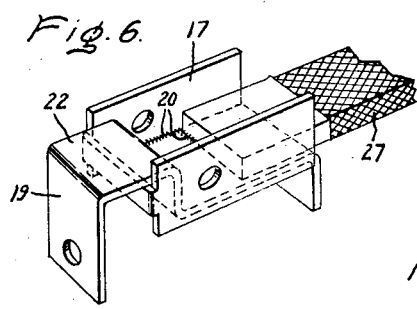

United States Patent Office 2,894,239
Patented July 7, 1959

2,894,239

BRUSH MECHANISM

Herman W. Schaffer, Erie, and William Speicher, North East, Pa., assignors to General Electric Company, a corporation of New York Application June 6, 1955, Serial No. 513,266

6 Claims. (Cl. 339—8)

This invention relates to a brush mechanism and more specifically to a brush mechanism for grounding currents from a traction motor to the wheels of the locomotive.

With the use of electric locomotives having an overhead power line where the power is returned through the rails, a heavy current is sometimes transferred from the traction motor to the driving wheels. Attempts to carry the heavy currents necessary during starting and regenerative braking without the use of a brush have resulted in severe pitting of the bearing surfaces of anti-friction journal or motor bearings caused by arcing or burning between the rollers and bearing races.

Therefore, it is an object of this invention to provide a brush mechanism for shunting the anti-friction bearings of a locomotive.

Briefly, in accordance with one aspect of our invention, we provide a low resistance ground return for a locomotive wherein traction motor current is carried through a metal graphite brush to a rotatable collector surface provided on the driver wheel of the locomotive. The brush is connected to a non-rotatable housing of a predetermined axial length surrounding the collector surface by a fulcrum and leaf spring mounting which allows a rocking motion of the brush to compensate for any relative motion between collector surface and the housing and provides a fitted pressure connection between the brush and collector.

Further objects and advantages of this invention will become apparent and this invention will be better understood from the following description referring to the accompanying drawings. The features of novelty which characterize this invention will be pointed out with particularity in the claims annexed to and forming a part of the specification.

Fig. 3 is a cross-sectional view taken along the line 3—3 of Fig. 1;

Fig. 3a is an enlarged view of the details shown within the circle A of Fig. 3;

Fig. 4 is a detail view of the spring shunt;

Fig. 5 is a detail view of the lock washer of this invention; and

Fig. 6 is a detail view showing brazing connections of the assembled clamping harness of this invention.

Figure 1:
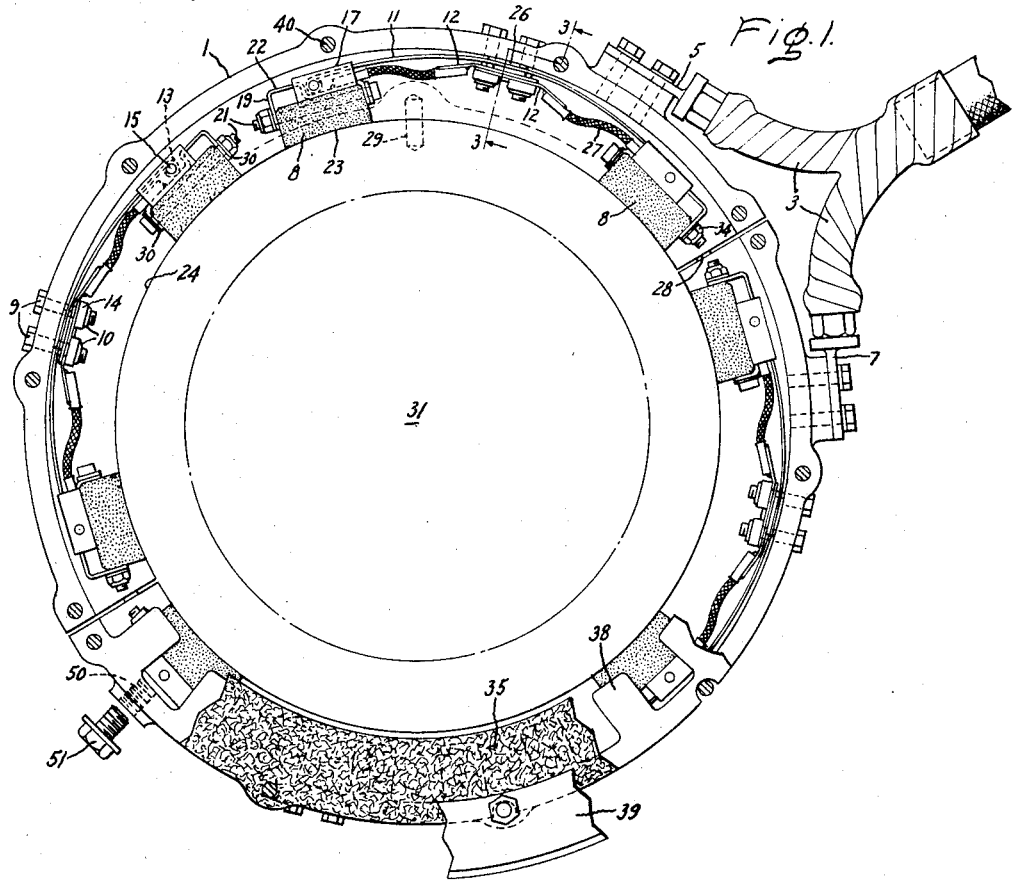
Fig. 1 is a side sectional view showing one embodiment of our invention.

Referring now to the drawings, we have shown the brushholder of our invention as having a ring-shaped bronze electrically conductive housing 1 mounted on the non-rotatable axle lining 2, which is the bearing supporting a current carrying member such as a traction motor (not shown). In order to provide a secure electrical connection to the current carrying member, the cables 3 are bolted to each half of the housing 1 at the copper terminals 5 and 7 respectively.

In order to mechanically support the rectangular brushes 8 from the housing 1 so as to have the longer axis of the brushes 8 lie tangentially to a radius of the housing, a pair of radially spaced bolts 9 is passed through the housing 1. This pair of bolts secures a spring steel leaf spring 11 at its middle to the inner surface of the housing, together with terminals 12 and the lock washer or locking channel 14 (Fig. 5). Self locking nuts 10 are inserted in the locking channel 14 and threaded on the bolts 9 so that the bolts 9 may be tightened from the outside of the housing 1.

Figure 2:
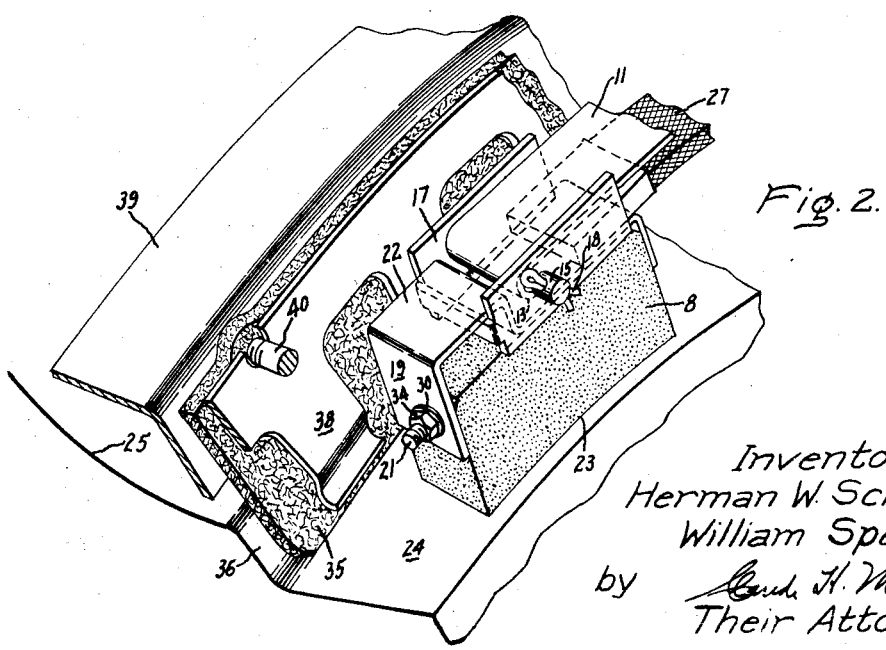
Fig. 2 is a perspective veiw of one of the metal graphite brushes of our invention.

The brushes 8 are pivotally supported on the eyes 13 on the ends of the spring steel leaf springs 11 by means of pin members 15, having a cotterway, which is passed through apertuers in the bifurcations of a U-shaped supporting member 17 (Fig. 2) and secured by a cotter pin 18. Between the pin 15 and bight portion of the U-shaped supporting member 17 is connected a copper clamping harness 19 which is brazed at 20 (Fig. 6) to the member 17 and to the braided cable 27. The clamping harness 19 is secured to the brushes 8 by the steel bolt 21. We prefer that the U-shaped supporting member 17 be of steel to provide walls for the apertures in the bifurcations which will not wear appreciably because of vibrations of the pin 15. Such wearing would tend to lower the eye 13 to contact the harness 19.

In order that the ends of the clamping harness 19 may be tightened to contact the brush 8 without warping the harness, the harness 19 is provided with a loop 22 which provides sufficient resiliency to allow for any manufacturing tolerances. It should be noted that the brazing 20 (Fig. 6) does not extend to the region of the loop 22.

This mounting assures a fitted electrical and mechanical contact between the curved surfaces 23 of the brushes 8 and the narrow collector surface 24 of the driver wheel 25. The collector surface 24 is limited to substantially 1" width on the driver wheel 25. The housing 1 of our invention must be mounted on the flange of the axle lining 2 to extend 1½" over this very narrow axial surface. The axial length of the housing 1 is determined by the structure of the locomotive truck (not shown). The pivotal mounting of the brushes 8 insures contact between both ends of the brush 8 and the collector surface 24, as shown in Fig. 1, and the looseness of the pin 15 in the pivot eye 13 allows contact between the collector surface 24 and both sides of the brush 8, so that a full brush fit may be more readily obtained.

The electrical connection between the brush 8 and the housing 1, as shown in Fig. 3, is through a U-shaped bypass or shunt copper member 26 to the electrical brush terminal 12, through the braided cable 27, which is brazed to one of the terminals 12 and to the clamping harness 19, and through the clamping harness 19 to the brush 8. This provides an all bronze and copper current connection which will not be affected by any rust which might form on the surfaces of the leaf spring 11. With respect to the electric connection between the housing 1 and the terminals 12, the member 26 shunts the steel spring 11 (Fig. 3a) which may rust during use to inhibit conductivity therethrough. Thus, the current path will not be corroded by repeated dampness to increase the resistance of this brush mechanism which shunts the antifrictional bearings. In order to assure a tight electrical and mechanical contact between the brush 8 and the clamping harness 19, the bolt 21 is a high strength steel bolt, provided with relatively large flat hardened steel washers 30 which prevent scoring of the clamping harness 19 when the bolt 21 and nut 34 are tightened in place. This washer also prevents compression of the ends of the clamping harness 19 by providing a sufficient area to distribute the bolt stress. In order to provide a greater elongation, the bolt 21 is designed to be long and of a small diameter. When the bolt is tightened, the resulting stress will prevent relative motion between the brush 8 and the clamping harness 14 for long periods of time despite severe vibrations. These connections will remain tight for the life of the brush if the proper bolt is used, resulting in an excellent electrical connection between the brush 8 and the clamping harness 19.

The brush 8 is pressed by the leaf spring 11 against the collector surface 24 to make a good electrical contact therewith. The leaf spring 11 is stressed sufficiently so that when assembled contact of the brush 8 on the collector surface 24 is maintained at high speed, despite severe vibrations caused by any roughness of the track or caused by relative motion between the frame 2 and the axle 31, which motion may be as great as 1/16". The shunt 26 is provided to prevent large currents from flowing through the relatively high resistance of the leaf spring 11.

The preferred method of assembling this brush mechanism is to braze the supporting member 17 to the harness 19, braze the braided cable 27 to the brush terminal 12 and the clamping harness 19, clamp the harness 19 securely to the brush 8 by attaching the steel bolt 21, connect the eye 13 of the leaf spring 11 to the bifurcations of the U-shaped supporting member 17 by the cottered pin 15, place the shunt 26 in place with a bifurcation on each side of the leaf spring 11, and then position the entire assembly so that the bolts 9 may be passed therethrough. Next, the locking channel 14 is positioned so that the bolts 9 may be tightened from the outside of the housing 1. Also in service, the bolts 9 may be tightened without opening the housing 1. When these assemblies have been tightened in each half of the housing 1, the housing is clamped on the flange of the axle lining 2 by the steel bolts 28 so that the brushes contact the collector surface 24, with one or more keys or roll pins 29 positioned between the housing 1 and the non-rotating frame 2 of the traction motor to prevent rotation of the housing 1. In order to maintain a tight fit of the housing 1, the bolts 28 are designed to be relatively long with a small diameter so that they will be elongated when tight and stress will be maintained throughout the life of the brushes 8.

Referring to Fig. 4, we have shown the copper shunt 26 in detail. It is preferred that the shunt 26 be used to prevent large currents from passing through the leaf spring 11. The shunt 26 thus reduces the resistance of the brush mechanism and thus reducing the probability of damaging currents being shunted through the anti-friction bearings. This is especially important because of the tendency of the spring steel to rust, thus increasing the impedance during the life of the brush mechanism. If the shunt 26 were omitted, heavy currents could heat the leaf spring, depending on the amount of corrosion or rust, tending to reduce its resiliency which would reduce the brush contact pressure and further increase the total resistance of the brush mechanism. The shunt member 26 is shown in detail as a U-shaped member having sufficient space between the bifurcations to accommodate the leaf spring 11 (Fig. 3) and provided with cutout portions 32 and 33 (Fig. 4) to accommodate the supporting bolts 9. In some installations, the shunt member 26 could, of course, be insulated by a varnish on the inside thereof and/or be longer than the one shown in Fig. 4, being provided with apertures to accommodate the bolts 9.

Referring to Fig. 5, the locking channel 14 is shown in detail provided with ears 45 which prevent rotation of the self-locking nuts 46 of the bolt 9 relative to the frame 1. The channel 14 is also provided with apertures 47 to accommodate the bolts 9.

In Fig. 6, we have shown the clamping harness 19 and the U-shaped supporting member 17 brazed at 18 together to form the assembled clamping harness. It should be noted that the brazing 18 between the harness 19 and the supporting member 17 does not extend into the region of the loop 22, so that the resiliency of the assembled harness is as great as that of the clamping harness 19 alone.

In order to prevent foreign matter from fouling the brush surfaces, the strong, dense, oil-soaked felt piece 35 is pressed against the wheel surface 36 by the spring fingers 38. The springs 38 should be flexible enough to maintain a sliding contact between the felt piece 35 and the surface 36 when the locomotive is "nosing" around curves which causes the motors to slide axially. The relative axial motion between the frame 2 and the axle 31 may be as great as 3/8" when the locomotive has been in service for some time. The felt piece 35, the spring fingers 38 and the deflector 39 are secured to the housing 1 by bolts 40, which should be of the type provided with a lock washer or a self-locking nut 41. We prefer that the pin 15 have its headed end adjacent to the spring fingers 38 so that the cotter pin 18 will not scratch or otherwise damage the spring fingers during vibration or other relative motion.

The assembly of this invention must necessarily be of the rugged construction which will not loosen with vibrations as the wheel itself is unsprung relative to the rails, so that any vibrations will be transmitted directly to the brush mechanism. In order to reduce maintenance costs and prevent service breakdown, the bolts 9, 21, 28 and 40 are provided with self-locking nuts.

We prefer that the housing 1 be of a material which is a good conductor and mechanically strong such as manganese bronze, so that it will not be heated appreciably by the heavy currents passing therethrough or damaged by severe vibrations. The brushes 8 should be of a metal graphite construction, which will provide low resistance to high currents and which will lubricate the collector surface 24 as the brush mechanism is operated.

In order that the brush mechanism may carry over 1500 amperes in the brushes 8 without excessive heating, it is preferred that the collector surface 24 have a sufficient circumference to accommodate eight brush surfaces of one square inch each. This must be done on the relatively narrow collector surfacce 24, the predetermined width which is determined by the structure of the wheel truck frame (not shown), and the traction motor. Thus a practicable size of the brushes 8 is 5/8" in the narrow dimension, leaving approximately 1/8" on each side of the 1" collector surface 24, which will not be used when the axial motion between the frame 2 and the axle 31 is at the maximum of 3/8". To provide the required capacity in the brush surface 23, we prefer that the longer dimension be substantially 2".

In order to determine the wear on one of the brushes 8 without disassembling the housing 1, the housing is provided with a threaded aperture 50 through which a gauge (not shown) may be inserted to determine the depth of the top of a brush mounted under the aperture. We prefer that the inspection aperture 50 be positioned at an accessible location on the housing 1. When the locomotive is in operation, the plug 51 is threaded into the aperture 50 and turned tight to prevent the entrance of dirt through the aperture 50 to foul the collector surface 24.

While we have shown and described one embodiment of our invention, further modifications and improvements will occur to those skilled in the art. We desire it understood, therefore, that this invention is not limited to the form shown, and we intend by the appended claims to cover all modifications which do not depart from the true spirit and scope of this invention.

What we claim as new and desire to cover by Letters Patent of the United States is:

1. A brush mechanism comprising a collector surface on a rotatable conductive wheel, a non-rotatable conductivee housing surrounding said collector surface, means mounted on said housing and contacting said wheel for preventing dirt from entering said housing to foul said collector surface, an electric terminal adapted to be connected to a source of current mounted on said housing, a leaf spring within said housing, a U-shaped copper shunt on said spring with a bifurcaction on each side thereof, a brush terminal within said housing, a pair of bolts for securing said spring, said shunt and said brush terminal to said housing so that said shunt is in electrical contact with both said housing and said brush terminal, a lock washer connected below the assembly of said spring, said shunt and said brush terminals for allowing said bolts to be tightened from outside said housing, a U-shaped supporting member having its bifurcations pivotally mounted on one end of said spring, a metal graphite brush having a curved surface adapted to contact said collector surface, a copper clamping harness member connected to said brush and connecting said brush to the bight portion of said supporting member whereby said brush is pivotally supported by said spring to have its curved surface contact said collector surface, a braided cable connected between said brush terminal and said harness whereby current flows from said electric terminal on said housing to said collector surface, said housing being provided with an aperture for inspecting said brush, and means for closing said aperture to prevent admission of dirt therethrough.

2. A brush mechanism comprising a cylindrical collector surface on a rotatable conductive wheel, said surface having substantially 1" width, a non-rotatable conductive bronze housing surrounding said surface, an electric terminal mounted on said housing and connected to a source of current, a rectangular metal graphite brush within said housing, the width of said brush being substantially 5/8", a leaf spring resiliently supporting said brush, a copper brush terminal, means for securing said leaf spring and said brush terminal to said housing, said brush being mounted pivotally on one end of said spring whereby the contact surface of said brush is pressed against said collector surface, a U-shaped copper shunt mounted on said spring with a bifurcation on each side of said spring in contact on one side with said housing and on the other side with said brush terminal, a clamping harness having a copper member secured to said brush and a copper braided cable connecting said copper member to said terminal whereby current flows a low resistance path from said source, through said electric terminal, to said housing, through said shunt to said brush terminal, through said braided cable to said brush, and through said collector surface to said wheel.

3. A brush mechanism comprising a cylindrical collector surface on a rotatable conductive wheel, a non-rotatable conductive housing surrounding said surface, an annular piece of felt supported by the housing for engaging completely an annular surface adjacent to the collector surface of the wheel to prevent dirt from entering the housing from one side, a resilient member supported by the housing to engage the piece to cause such engagement, an electric terminal mounted on the housing and connected to a source of current for transmitting electric current to the housing, a leaf spring secured within the housing, a brush pivotally supported by an end of the leaf spring to engage the collector surface, and electric circuit means including a U-shaped low resistance electric shunt electrically shunting the spring for connecting the brush to the housing by a low resistance path.

4. A brush mechanism comprising a cylindrical collector surface on a rotatable conductive wheel, a non-rotatable conductive housing surrounding the collector surface, means mounted on the housing and contacting the wheel for preventing admission of dirt to foul the collector surface, an electric terminal mounted on the housing and connected to a source of current, a leaf spring, a brush terminal, a U-shaped electric shunt on the spring with a bifurcation on each side thereof in contact on one side with the housing and on the other side with the brush terminal, means for clamping the terminal, the shunt and the spring within the housing, a metal graphite brush pivotably secured to one end of the spring whereby the contact suurface of the brush is pressed against the collector surface, a clamping harness secured to the brush and a braided cable connecting the harness to the brush terminal whereby a major portion of the current flowing in the brush flows from the source through the electric terminal to the housing, through the shunt to said brush terminal, through the braided cable to the brush, and through the collector surface to the wheel.

5. A brush mechanism comprising a collector surface on a rotatable conductive wheel; a non-rotatable conductive housing surrounding said collector surface; an electric terminal mounted on said housing and adapted to be connected to a source of current; a leaf spring within said housing; a U-shaped shunt on said spring with a bifurcation on each side thereof; a brush terminal within said housing; a nut-locking channel member; a pair of bolts and associated nuts for securing said spring, said shunt, said brush terminal and said locking channel member to said housing so that said shunt is in electrical contact with both said housing and said brush terminal; a U-shaped supporting member pivotally mounted on one end of the spring; a brush adapted to contact the collector surface; a copper clamping harness member connected to said brush and secured to the U-shaped supporting member; said clamping member having a flexible loop portion near one end thereof to afford means for bringing the entire brush-engaging portions of said member into close contact with the brush; means defining aligned apertures through said brush and the brush-engaging portions of the clamping member; a bolt inserted through said apertures; means including a nut tightly threaded on one end of said bolt to longitudinally stress the bolt; and a flexible cable electrically connected between said brush terminal and said brush whereby current flows between the electric terminal on said housing and the collector surface.

6. A brush mechanism comprising a collector surface on a rotatable conductive wheel, a non-rotatable conductive housing surrounding said surface, an electric terminal mounted on said housing and adapted to be connected to a source of current, a brush within said housing, a leaf spring within said housing, means for securing said leaf spring to said housing, a support member pivotally mounted on one end of said spring, a flexible brush clamping harness secured to said support member, a U-shaped shunt mounted on said spring with a bifurcation on each side of said spring and having one bifurcation in contact with said housing, a bolt for securing said flexible clamping harness to said brush, means including a nut threaded on one end of said bolt for highly stressing said bolt in a longitudinal direction to prevent disassembly of the clamping member by vibration, and means for electrically connecting the other bifurcation of said shunt to the clamping member.

References Cited in the file of this patent
UNITED STATES PATENTS

| 1,070,102 | Berdon | Aug. 12, 1913 |
| 1,090,887 | Simpson | Mar. 24, 1914 |
| 1,268,293 | Stanley | June 4, 1918 |
| 1,594,055 | Filkins | July 27, 1926 |
| 1,802,957 | Ragsdale | Apr. 28, 1931 |
| 2,073,830 | Caley | Mar. 16, 1937 |
| 2,242,273 | Taylorson | May 20, 1941 |
| 2,711,519 | Barrett | June 21, 1955 |